United States Patent [19]

Haug et al.

[11] Patent Number: 4,552,935

[45] Date of Patent: Nov. 12, 1985

[54] HEAT-CURABLE EPOXY RESIN MIXTURES CONTAINING IMIDE COMPOUNDS AND CONDENSATION PRODUCTS OF PHENOLS, AMINES AND ALDEHYDES OR KETONES

[75] Inventors: Theobald Haug, Frenkendorf; Friedrich Stockinger, Hölstein, both of Switzerland

[73] Assignee: Ciba-Geigy Corporation, Ardsley, N.Y.

[21] Appl. No.: 568,845

[22] Filed: Jan. 6, 1984

[30] Foreign Application Priority Data

Jan. 13, 1983 [CH] Switzerland .................. 175/83

[51] Int. Cl.$^4$ .................. C08L 61/00; C08G 8/32; C08G 14/06
[52] U.S. Cl. .................. 525/488; 525/480; 525/490; 525/509; 525/510; 525/514
[58] Field of Search .................. 525/481, 488, 490

[56] References Cited

U.S. PATENT DOCUMENTS

| | | | |
|---|---|---|---|
| 3,522,271 | 7/1970 | Kalil | 260/326.3 |
| 3,714,121 | 1/1973 | Kobel et al. | 525/481 |
| 3,725,345 | 4/1973 | Bargain | 528/113 |
| 3,730,948 | 5/1973 | Akiyama et al. | 528/113 |
| 4,128,598 | 12/1978 | Makino et al. | 260/837 |
| 4,401,777 | 8/1983 | Tsuboi et al. | 523/455 |

FOREIGN PATENT DOCUMENTS 2217099 9/1973 Fed. Rep. of Germany .
59341A 12/1976 Fed. Rep. of Germany .
4529390 7/1966 Japan .
53-78299 7/1978 Japan .
1439637 6/1976 United Kingdom .

OTHER PUBLICATIONS

Houben-Weyl, 1963, vol. XIV/2, p. 294.

Primary Examiner—John Kight
Assistant Examiner—Garnette D. Draper
Attorney, Agent, or Firm—Luther A. R. Hall

[57] ABSTRACT

Heat-curable mixtures containing (a) epoxy compounds having on average more than one 1,2-epoxy group per molecule, (b) monoimides or polyimides of specific unsaturated dicarboxylic acids of the formula I

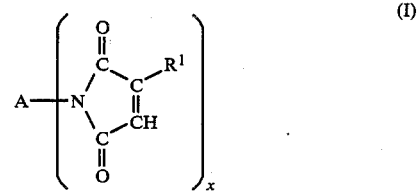

wherein A is an x-valent aromatic or aliphatic radical, R$^1$ is hydrogen or methyl, and x is 1, 2 or 3, and (c) products of condensing specific phenols, specific amines and aldehydes or ketones in an acid medium.

The novel curable mixtures have a long shelf life and give rise to moulded materials which are highly resistant to chemicals and resistant to boiling water.

17 Claims, No Drawings

HEAT-CURABLE EPOXY RESIN MIXTURES CONTAINING IMIDE COMPOUNDS AND CONDENSATION PRODUCTS OF PHENOLS, AMINES AND ALDEHYDES OR KETONES

The present invention relates to curable mixtures of epoxy compounds, monoimides or polyimides of specific unsaturated dicarboxylic acids and products of condensing specific phenols, specific amines and aldehydes or ketones in an acid medium.

French Pat. No. 2,201,313 discloses that epoxy resins can be cured with prepolymers having maleimide groups. To improve the properties of the moulded materials based on epoxy resins and bis-maleimides, it has already been proposed more than once to modify the curable mixtures. German Pat. No. 2,728,843, for instance, discloses adding, to the mixtures of epoxy resin and bis-maleimides, a substituted or unsubstituted aminophenol as modifying component. However, curing these mixtures takes long curing times and high curing temperatures. Japanese Preliminary Published Application Sho No. 53-078,299 proposes reaction products of phenols and anhydroformaldehydeaniline for use as modifying component for curable mixtures of epoxy resins and bis-imides. As is known, anhydroformaldehydeaniline is heat-cleaved by phenols (see Methoden der Organischen Chemie [Methods of Organic Chemistry] (Houben-Webyl), 1963, Volume XIV/2, page 294) to form N-(p-hydroxybenzyl)-anilines.

It has now been found that products of condensing specific phenols, specific aromatic amines and aldehydes or ketones in an acid medium are useful modifying agents for curable mixtures based on epoxy resins and monoimides or polyimides of specific unsaturated dicarboxylic acids, since they are more readily processed in these mixtures and the moulded materials prepared therefrom are more resistant to chemicals and are highly resistant to boiling water.

The present invention thus provides curable mixtures containing
 (a) epoxy resins having on average more than one 1,2-epoxy group per molecule,
 (b) monoimides or polyimides of specific unsaturated dicarboxylic acids of the general formula I

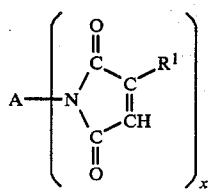

(I)

in which A is an x-valent organic radical having at least 2 and at most 30 C atoms, $R^1$ is an H atom or methyl, and x is 1, 2 or 3, and
 (c) products of condensing phenols, amines and aldehydes or ketones in an acid medium by reacting with one another at a pH no higher than 6
  (1) substituted monohydric phenols which are unsubstituted in the p-position and in one of the two o-positions or in both o-positions, unsubstituted dihydric mononuclear phenols or unsubstituted or substituted dihydric or polyhydric dinuclear or polynuclear phenols which have at least two reactive ring positions for reaction with aldehyde or ketone,
  (2) substituted aromatic monoamines which have at least one, preferably at least two, reactive ring positions for reaction with aldehyde or ketone, unsubstituted aromatic mononuclear or dinuclear diamines or substituted aromatic mononuclear or dinuclear diamines which have at least two reactive ring positions for reaction with aldehyde or ketone, and
  (3) aldehydes or ketones, in a mixing ratio in the reaction mixture of phenol to amine to aldehyde or ketone of 1:1:1.2 to 6:1:8, preferably 2:1:4 to 6:1:8, in particular 3:1:5 to 6:1:8, moles and in the presence, in the curable mixture, of at least 1 equivalent of imide group per equivalent of amine-hydrogen and of at least 1 equivalent of phenolic hydroxyl group per epoxy equivalent.

The mixtures according to the invention preferably contain as (a) epoxy compounds having aromatic groupings in the molecule, for example polyglycidyl ethers of polyhydric phenols or polyglycidyl esters or aromatic polybasic carboxylic acids, as (b) bis-maleimides of the formula I in which A is an aromatic or aliphatic radical, $R^1$ is an H atom, and x is 2, and as (c) condensation products wherein the reaction component (1) takes the form of substituted monohydric phenols which are unsubstituted in the p-position and in one of the two o-positions or in both o-positions or of substituted dihydric or polyhydric, dinuclear or polynuclear phenols which have at least two reactive ring positions for reaction with aldehyde or ketone, and reaction component (2) takes the form of substituted aromatic monoamines which have at least one, preferably two, reactive ring positions for reaction with aldehyde or ketone or of unsubstituted or substituted aromatic dinuclear diamines which have at least two reactive ring positions for reaction with aldehyde or ketone.

The mixtures according to the invention contain in particular, as epoxy compounds (a), polyglycidyl ethers of dihydric or polyhydric, dinuclear or polynuclear phenols, as compounds (b), bis-maleimides of the formula I in which A is an aromatic radical, $R^1$ is an H atom, and x is 2, and, as condensation products (c), those wherein reaction component (1) is o- or p-alkylphenol or dihydric dinuclear phenol substituted in the o,o'-position, reaction component (2) is o- or p-toluidine, 2,6-diethylaniline, 4,4'-diaminodiphenyl sulfone or 3,3'-dimethyl-4,4'-diaminodiphenylmethane, and reaction component (3) is formaldehyde, acetaldehyde, propionaldehyde or acetone.

Preferred condensation products (c) in the mixtures according to the invention have furthermore been prepared at pH 5.5-0.5.

The mixing ratio between the polyimides of the formula I and condensation products (c) can vary within a wide range. It is so chosen that the number of equivalents of imide group is at least equal to the number of equivalents of amine-hydrogen. The curable mixtures according to the invention preferably contain more imide group equivalents than amine-hydrogen equivalents. The excess can be up to 5-fold. The curable mixtures contain in particular 1.3 to 3 equivalents of imide group per equivalent of amine-hydrogen.

It is similarly possible to use a small excess of phenolic hydroxyl groups, based on the equivalents of epoxide group, in the curable mixtures. This excess can be up to 1.8 equivalents of phenolic hydroxyl group per 1 equivalent of epoxy group.

A suitable epoxy compound (a) which can be used in the curable mixtures can be any type of epoxy resin, for example of the type which contain groups of the formula II

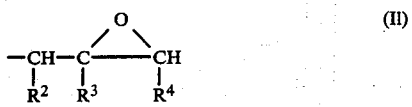

which are directly bonded to oxygen, nitrogen or sulfur atoms and in which either $R^2$ and $R^4$ are each a hydrogen atom, in which case $R^3$ are each a hydrogen atom, is a hydrogen atom or a methyl group, or $R^2$ and $R^4$ are together —$CH_2CH_2$—, in which case $R^3$ is a hydrogen atom.

Examples of such resins are polyglycidyl and poly($\beta$-methylglycidyl) esters which can be obtained by reacting a compound which contains two or more carboxylic acid groups per molecule with epichlorohydrin, glycerol dichlorohydrin or $\beta$-methylepichlorohydrin in the presence of alkali. Polyglycidyl esters of this type can be derived from aliphatic polycarboxylic acids, for example oxalic acid, succinic acid, glutaric acid, adipic acid, pimelic acid, suberic acid, azelaic acid, sebacic acid or dimerised or trimerised linoleic acid, cycloaliphatic polycarboxylic acids, such as tetrahydrophthalic acid, 4-methyltetrahydrophthalic acid, hexahydrophthalic acid and 4-methylhexahydrophthalic acid, and aromatic polycarboxylic acids, such as phthalic acid, isophthalic acid and terephthalic acid.

Further examples are polyglycidyl and poly($\beta$-methylglycidyl) ethers which can be obtained by reacting a compound containing at least two free alcholic and/or phenolic hydroxyl groups per molecule with the corresponding epichlorohydrin under alkaline conditions, or in the presence of an acid catalyst with subsequent alkali treatment. These ethers can be prepared with poly(epichlorohydrin) from acyclic alcohols, such as ethylene glycol, diethylene glycol and higher poly-(oxyethylene) glycols, propane-1,2-diol and poly(oxypropylene) glycols, propane-1,3-diol, butane-1,4-diol, poly(oxytetramethylene) glycols, pentant-1,5-diol, hexane-1,6-diol, hexane-2,4,6-triol, glycerol, 1,1,1-trimethylolpropane, pentaerythritol and sorbitol, from cycloaliphatic alcohols, such as resorcitol, quinitol, bis-(4-hydroxycyclohexyl)-methane, 2,2-bis-(4-hydroxycyclohexyl)-propane and 1,1-bis-(hydroxymethyl)-cyclohex-3-ene, and from alcohols having aromatic nuclei, such as N,N-bis-(2-hydroxyethyl)-aniline and p,p'-bis-(2-hydroxyethylamino)-diphenylmethane.

They can further be prepared from mononuclear phenols, such as resorcinol and hydroquinone, and polynuclear phenols, such as bis-(4-hydroxyphenyl)-methane, 4,4-dihydroxydiphenyl, bis-(4-hydroxyphenyl) sulfone, 1,1,2,2-tetrakis-(4-hydroxyphenyl)-ethane, 2,2-bis-(4-hydroxyphenyl)-propane (also known as bisphenol A) and 2,2-bis-(3,5-dibromo-4-hydroxyphenyl)-propane as well as from novolaks formed from aldehydes such as formaldehyde, acetaldehyde, chloral and furfurol, and phenols, such as phenol itself and phenol ring-substituted by chlorine atoms or alkyl groups of up to nine carbon atoms each, such as 4-chlorophenol, 2-methylphenol and 4-tert.-butylphenol.

Poly-(N-glycidyl) compounds include, for example, those which are obtained by dehydrochlorinating the reaction products of epichlorohydrin with amines containing at least two amino-hydrogen atoms, such as aniline, n-butylamine, bis-(4-aminophenyl)-methane and bis-(4-methylaminophenyl)-methane; triglycidyl isocyanurate, and N,N'-diglycidyl derivatives of cyclic alkyleneureas, such as ethyleneurea and 1,3-propyleneurea, and hydantoins, such as 5,5-dimethylhydantoin.

Poly-(S-glycidyl) compounds are, for example, the di-S-glycidyl derivatives of dithiols, such as ethane-1,2-di-thiol and bis-(4-mercaptomethylphenyl) ether.

Examples of epoxy resins having groups of the formula II in which $R^5$ and $R^7$ are together a —$CH_2CH_2$— group are bis-(2,3-epoxycyclopentyl) ether, 2,3-epoxycyclopentyl glycidyl ether and 1,2-bis-(2,3-epoxycyclopentyloxy)-ethane.

Also possible are epoxy resins in which the 1,2-epoxy groups are bonded to different hetero atoms, for example the N,N,O-triglycidyl derivative of 4-aminophenol, the glycidyl ether/glycidyl ester of salicylic acid or p-hydroxybenzoic acid, N-glycidyl-N'-(2-glycidyloxypropyl)-5,5-dimethylhydantoin and 2-glycidyloxy-1,3-bis-(5,5-dimethyl-1-glycidylhydantoin-3-yl)-propane.

If desired it is also possible to use epoxy resin mixtures.

Preferred epoxy resins have an aromatic grouping in the molecule, for example polyglycidyl ethers of polyhydric phenols or the N-glycidyl compounds of aromatic amines.

Especially preferred epoxy resins are the polyglycidyl ethers of polyhydric phenols, for example the polyglycidyl ethers of 2,2-bis-(4-hydroxyphenyl)-propane, of bis-(4-hydroxyphenyl)-methane, of 2,2-bis-(p-hydroxytetrabromophenyl)-propane, of tetra-(p-hydroxyphenyl)-ethane or of a novalak formed from formaldehyde and phenol or from chlorine-or alkyl-substituted phenol and having a 1,2-epoxy content exceeding 0.5 Eq/kg, and the poly-(N-glycidyl) compound obtainable by glycidylating 4,4'-diaminodiphenylmethane.

The monoimides and polyimides of the formula I are, like the previously mentioned epoxy compounds, known compounds and can be prepared by applying the methods described in U.S. Pat. No. 3,010,290 and in British Pat. No. 1,137,592, namely by reacting the corresponding diamines with the unsaturated dicarboxylic anhydrides in a polar solvent and in the presence of a catalyst.

The symbol A in the formula I can be, for example, a linear or branched alkylene radical having less than 20 carbon atoms, a phenylene radical, a cyclohexylene radical or a radical of the formula

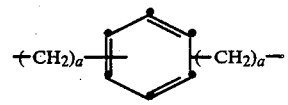

in which a is an integer from 1 to 3.

The symbol A can also encompass two or more phenylene or cyclohexylene radicals which are linked directly or by way of a single valency bond or by way of an atom or an inert group, for example oxygen or sulfur atoms, alkylene groups having 1 to 3 carbon atoms or by way of the following groups: —CO—, —$SO_2$—, —NR—(R=alkyl), —N=N—, —CONH—, —COO—, —COHN—A—NHCO—, O=P(O—)$_3$ or S=P(O—)$_3$.

Moreover, the various phenylene or cyclohexylene radicals can be substituted by alkyl groups, for example methyl groups, or hydroxyl or carboxyl groups. Specific examples of polyimides of the formula I are N-phenylmaleimide, N-o-hydroxyphenylmaleimide, N-p-carboxyphenylmaleimide, N,N'-ethylene-bis-maleimide, N,N'-hexamethylene-bis-maleimide, N,N'-m-phenylene-bis-maleimide, N,N'-p-phenylene-bis-maleimide, N,N'-4,4'-diphenylmethane-bis-maleimide, N,N'-4,4'-3,3'-dichloro-diphenylmethane-bis-maleimide, the bis-maleimide of N,N'-4,4'-diphenyl ether, the bis-maleimide of N,N'-4,4'-diphenyl sulfone, N,N'-4,4'-dicyclohexylmethane-bis-maleimide, N,N'-α,α'-4,4'-dimethylenecyclohexane-bis-maleimide, N,N'-m-xylylene-bis-maleimide, N,N'-p-xylylene-bis-maleimide, N,N'-4,4'-diphenylcyclohexane-bis-maleimide, N,N'-m-phenylene-bis-citraconimide, N,N'-4,4'-diphenylmethane-bis-citraconimide, N,N'-4,4'-2,2-diphenylpropane-bis-maleimide, the N,N',N''-trismaleimide of tris-(4-aminophenyl) phosphate and the N,N',N''-trismaleimide of tris-(4-aminophenyl) thiophosphate.

It is also possible to use mixtures of two or more of these polyimides.

Condensation products (c) which are obtainable in an acid medium can be prepared by the methods described in "Methoden der organischen Chemie" ["Methods of Organic Chemistry"] (Houben-Weyl), Volume XIV/2 (1963), pages 201 to 213, or in German Offenlegungsschrift No. 2,217,099, namely by subjecting the corresponding phenols (1), amines (2) and aldehydes or ketones (3) to a condensation reaction in the presence of an acid, mineral acid or organic acid at a pH of at most 6, preferably at pH 5.5–0.5. This reaction can be carried out in one or more stages. For example, it is possible first to prepare a precondensate from the phenol (1) or the amine (2) with the aldehyde or acetone (3), and then to react the precondensate with the third component, in the presence or absence of further aldehyde or acetone, to give the condensation product (c).

Not only the phenols used in preparing condensation products (c) but also the amines used can be substituted with any substituent which does not take part in the condensation reaction and which thus behaves neutrally. Substituents of this type can be, for example, halogen atoms, preferably chlorine or bromine atoms, alkyl groups, preferably those having 1 to 4 C atoms, for example allkyl or 1-propenyl, alkoxy groups, preferably having 1 to 4 C atoms, or esterified carboxyl groups having 1 to 4 C atoms in the alcohol component.

Examples of suitable substituted monohydric phenols (1) are p-chlorophenol, o-bromophenol, o-cresol, p-cresol, p-chloro-m-cresol, o-allylphenol, 2-propenyl-phenol, p-nonylphenol, o-methoxyphenol, o-ethoxyphenol, p-nitrophenol, p-phenylphenol, o-phenolsulfonic acid, thymol, carvacrol, the xylenols 1,2-dimethyl-3-hydroxybenzene, 1,2-dimethyl-4-hydroxybenzene and 1,4-dimethyl-2-hydroxybenzene, and also guaiacol.

Unsubstituted dihydric mononuclear phenols (1) are pyrocatechol, resorcinol and hydroquinone.

Suitable unsubstituted or substituted dihydric dinuclear phenols (1) have, for example, the formula III

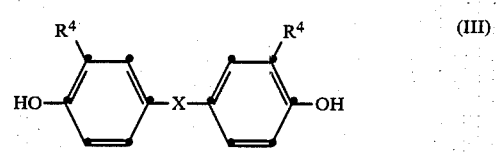

in which each $R^4$ is a hydrogen or halogen atom, alkyl having 1 to 9 C atoms, alkenyl having up to 4 C atoms, or alkoxy having 1 to 4 C atoms, and X is a single bond, alkylene having up to 5 C atoms, cycloalkylene, preferably cyclohexylene, $-SO_2-$, $-SO-$, $-S-$ or $-O-$. Specific examples of compounds of the formula III, which are known compounds, are 2,2-bis-(3-methyl-4-hydroxyphenyl)-propane, 2,2-bis-(3-chloromethyl-4-hydroxyphenyl)-propane, bis-(3-tert.-butyl-4-hydroxyphenyl) sulfone, 2,2-bis-(3-alkyl-4-hydroxyphenyl)-methane, 4,4'-dihydroxyphenyl, 2,4-bis-(4-hydroxyphenyl)-2-methylbutane and bis-(4-hydroxyphenyl)-methane.

Suitable substituted polyhydric polynuclear phenols (1) are for example of the formula IV

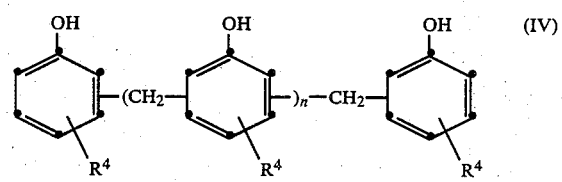

in which $R^4$ is as defined in formula III, and n is a number from 1 to 10.

The compounds of the formula IV are known compounds and can be prepared by reacting $R^4$-substituted phenol with formaldehyde in a known manner to give the corresponding novolaks.

Examples of suitable substituted aromatic monoamines (2) are o-, p- or m-toluidine, o,o'- or o,p-dimethylaniline, o,o'- or o,p-diethylaniline, o-methyl-o'-ethylaniline, o-isopropyl-o'-methylaniline and sulfanilic acid.

The unsubstituted aromatic mononuclear diamines (2) are o-, m- and p-phenylenediamine, which can be dialkylated.

Suitable unsubstituted or substituted aromatic dinuclear diamines (2) are for example of the formula V

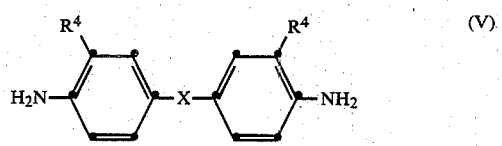

in which $R^4$ and X are as defined in the formula III. The compounds of the formula V are known, and specific examples thereof are 4,4'-diaminodiphenylmethane, 3,3'-dichloro-4,4'-diaminodiphenylmethane, bis-(4-aminophenyl)-2,2-propane, 4,4'-diaminodiphenyl ether, 4,4'-diaminodiphenyl sulfone, 4,4'-diaminodiphenyl sulfide, 4,4'-diaminodiphenyl ether and 3,3'-dimethyl-4,4'-diaminodiphenylmethane.

Examples of suitable aromatic dinuclear, unsubstituted or substituted diamines also include 1,5-diaminonaphthalene and its monoalkyl- or dialkyl-substituted derivatives.

The aldehyde or ketone (3) used in preparing the acidic condensation products (c) can be in principle any compounds having an aldehyde or reactive keto group. Commercially available aldehydes or ketones are preferably used, examples being formaldehyde, acetaldehyde, propionaldehyde, chloral, bromal, benzaldehyde or furfural, or acetone, diethyl ketone, acetophenone or benzophenol. Use is made in particular of formaldehyde, acetaldehyde, propionaldehyde or acetone.

To cure the curable mixtures according to the invention, they can have added, if desired, curing accelerators or catalysts. Examples of suitable compounds of this type are quaternary ammonium salts, imidazoles, imidazolines or phosphonium salts of organic or inorganic acids. However, it is also possible to use any other catalyst which effectively accelerates the reaction of a 1,2-epoxy group with a phenolic hydroxyl group.

The curing accelerators or catalysts are used in an amount of 0.01 to 10% by weight, preferably 0.1 to 5% by weight, based on the total weight of the epoxy compound (a), imide compound (b) and condensation product (c).

The curable mixtures according to the invention are chiefly used in surface protection, electrical engineering, laminating and construction. They can be used in the form of a formulation adapted to the specific intended use, in the unfilled or filled state, in the form of solutions or dispersions—as the case may be, or in the form of paints, compression-moulding compositions, sinter powders, dip resins, injection-moulding formulations, impregnating resins, binders and in particular laminating resins.

The invention therefore also provides a process for preparing crosslinked, insoluble and infusible plastic products, which comprises reacting with one another epoxy compounds having on average more than one epoxy group per molecule, monoimides or polyimides of specific unsaturated dicarboxylic acids of the formula I, and products of condensing phenols, amines and aldehydes or ketones in an acid medium, at temperatures between 120° to 250° C., preferably 150° to 200° C.

It is also possible first to prepare a reaction product between the condensation product prepared in an acid medium and the imide by heating a mixture of these two products to above the softening point of the mixture. This mixture, preferably in the form of a solution in methyl ethyl ketone or 2-methoxypropanol, can then be mixed with the epoxide.

The preparation according to the invention of the crosslinked, infusible products is, in general, combined with simultaneous shaping into mouldings, sheetlike structures, laminates, bonded structures or foams. In this step, the curable compositions can have added to them the additives customary in the technology of curable plastics, such as fillers, plasticisers, pigments, dyes, mould-release agents, blowing agents and flame-retardant materials. The fillers can be for example glass fibres, mica, ground quartz, kaolin, colloidal silica or metal powder; the mould-release agent used can be for example calcium stearate, and the blowing agent can be for example azodicarboxamides, $\alpha,\alpha'$-azoiso-butyronitrile or organic sulfohydrazides.

Preparation of the condensates of phenols, amines and aldehydes or ketones in an acid medium Condensate I:

A vessel which is equipped with a stirrer, a thermometer, a dropping funnel, a reflux condenser and a gas-inlet tube is charged with 1.35 kg of o-cresol and 0.446 kg of o-toluidine, which are mixed, and the air in the flask is displaced by nitrogen. 0.512 kg of anhydrous acetic acid is then allowed to flow in, initiating an exothermic reaction. The mixture is heated to 85° C. before 0.623 kg of paraformaldehyde is added in the course of 30 minutes. This addition steeply raises the temperature of the flask contents up to 115° C. After the exothermic reaction has died down, the product is stirred under nitrogen at about 95° C. for 10 hours. The heating bath is then removed, and 2.8 kg of acetone are allowed to flow in, the temperature dropping to about 60° C. 0.17 kg of ammonia gas is then passed in in the course of about 2 hours, and the inhomogenous liquid is allowed to cool down to room temperature and left to stand until the two layers have completely separated. The organic phase is separated off and added dropwise, with thorough stirring, to 9 kg of an ice/water mixture in the course of about 1 hour, during which a solid substance precipitates. It is filtered off, washed with plenty of water and then dried. This gives 1.92 kg of a pale beige powder having a softening point of 129° C.

Condensate II:

A 4.5 liter sulfonating flask which is equipped with a metal horseshoe stirrer, a thermometer, a reflux condenser and a dropping funnel is charged with 248.3 g (1.0 mole) of 4,4'-diaminodiphenyl sulfone, 648.8 g (6.0 moles) of o-cresol and 189.1 g (2.1 moles) of oxalic acid, and the mixture is stirred as 528 g (6.5 moles) of 37% aqueous formaldehyde are added dropwise at a temperature of 83° to 93° C. in the course of 35 minutes. The reaction mixture is allowed to react at the boil for 3 hours and 40 minutes and is then neutralised with 589.2 g (4.2 moles) of 40% aqueous potassium hydroxide, the aqueous phase is decanted off, 1 liter of boiling water is added, the reaction mixture is stirred for 10 minutes, the aqueous phase is decanted off, and the procedure is repeated 6 times. After the soluble portions have been washed out, the reaction mixture is dissolved in 2 liters of acetone, the solution is filtered, and the filtrate is introduced into 36 liters of ice-water which is vigorously mixed with a turbine mixer. The precipitated product is filtered off, washed with water and then dried in vacuo at 50° C.

This gives 848.9 g of a yellowish powder whose Kofler softening point is 148° C.

Condensate III:

149.2 g (1.0 mole) of 2,6-diethylaniline, 368.4 g of a technical o-cresol novolak (equivalent weight: 122.8), 101.5 g (1.25 moles) of 37% aqueous formaldehyde and 107.9 g (0.55 mole) of 55% aqueous sulfuric acid are reacted for 4 hours and 24 minutes as for the preparation of condensate II, and the reaction mixture is then neutralised with 123.4 g (1.10 moles) of 50% aqueous potassium hydroxide. The workingup is as for condensate II, to give 518.6 g of a beige pulverulent novalak whose Kofler softening point is 100° C.

Condensate IV 226.3 g (1.0 mole) of 3,3'-dimethyl-4,4'-diaminodiphenylmethane, 648.8 g (6.0 moles) of cresol, 99.1 g (1.1 moles) of oxalic acid and 528 g (6.5 moles) of 37% aqueous formaldehyde are reacted for 4 hours as for the preparation of condensate II. The working-up and purification is as described in the preparation of condensate II. This gives 943.7 g of a yellowish pulverulent novalak which has a Kofler softening point of 98° C.

Condensate V:

242.4 g (2.0 moles) of 2,4-dimethylaniline, 491.2 g of a technical o-cresol/formaldehyde novolak (average molecular weight $\overline{M}n=714$; OH equivalent weight=122.8), 215.8 g (1.1 moles) of 50% sulfuric acid and 202.9 g (2.5 moles) of 37% formaldehyde are reacted for 4 hours and 40 minutes as described in the preparation of condensate II. The reaction mixture is worked up as for the preparation of condensate II, to give 689.8 g of a pulverulent novolak which has a Kofler softening point of 98° C. and contains 3.24% of nitrogen.

Condensate VI:

298.5 g (2.0 moles) of 2-isopropyl-6-methylaniline, 491.2 g of a technical o-cresol/formaldehyde novolak (average molecular weight $\overline{M}n=714$; OH equivalent weight=122.8), 202.9 g (2.5 moles) of 37% aqueous formaldehyde and 215.8 g (1.1 moles) of 50% sulfuric acid are reacted at 130°–135° C. for 4 hours and 15 minutes analogously to condensate II, and the reaction mixture is neutralised with 246.9 g (2.2 moles) of 50% potassium hydroxide solution and worked up as described in Example 1. This gives 775.8 g of a yellowish powder which has a Kofler softening point of 114° C. The nitrogen content of the reaction product is 3.19%.

EXAMPLE 1

A solution is prepared from 111 g of 4,4'-methylene-bis-(N-phenylmaleimide) and 300 g of condensate II in 275 g of methyl ethyl ketone. This solution is heated at the boil for 2.5 hours.

A further solution is prepared from 203 g of 1,1,2,2-tetra-(p-glycidyloxyphenyl)-ethane (ERRA® 0163) and 176 g of tetrabromobisphenol A diglycidyl ether having an epoxide content of 2.75 Eq/kg in 170 g of methyl ethyl ketone. The two solutions are mixed.

This solution is used to impregnate a glass mat (weight per unit area: 200 g/m$^2$), which is then dried at 140° C. to give a so-called prepreg. 8 layers at a time of this prepreg are pressed together at 180° C. and under a pressure of $29.4 \times 10^4$ Pa for 2 hours to give a laminated board.

2 minutes' exposure of laminate samples (5×5 m) to the vapour of boiling trichloroethylene increases the weight of the samples by 0.02%. Trichloroethylene is a frequently used solvent in the manufacture of circuit boards. It is important that as little as possible of it is absorbed by the laminate.

EXAMPLE 2

A solution is prepared from 148 g of 4,4'-methylene-bis-(N-phenylmaleimide) and 333 g of condensate I in 445 g of methyl ethyl ketone. This solution is heated at the boil for 2.5 hours. A further solution is prepared from 192 g of 1,1,2,2-tetra-(p-glycidyloxyphenyl)-ethane, 165 g of tetrabromobisphenol A diglycidyl ether and 240 g of methyl ethyl ketone. The two solutions are mixed at room temperature.

As described in Example 1, this solution is used together with the glass mat to prepare laminates which have a trichlorotethylene absorption of only 0.01% by weight in the construction of Example 1.

EXAMPLE 3

A solution of 220 g of 4,4'-methylene-bis-(N-phenylmaleimide) and 333 g of condensate I in 470 g of methyl ethyl ketone is heated at the boil for 0.5 hour. A further solution is prepared from 192 g of 1,1,2,2-tetra-(p-glycidyloxyphenyl)-ethane (ERRA® 0163) and 165 g of tetrabromobisphenol A diglycidyl ether having an epoxide content of 2.75 Eq/kg in 240 g of methyl ethyl ketone.

These two solutions are mixed at room temperature, and the resulting solution is then used as described in Example 1 to prepare, together with glass mat, laminates. Exposure for 2 minutes to the vapour of boiling trichloroethylene increases the weight by 0.01%.

EXAMPLE 4

A solution is prepared from 333 g of condensate I, 264 g of 4,4'-methylene-bis-(N-phenylmaleimide) and 470 g of methyl ethyl ketone. This solution is heated at the boil for 2.5 hours. A second solution is prepared using the same epoxy resins as in Example 3, and is mixed with the first solution at room temperature. The mixture of the two solutions is used as in Example 1 for preparing glass fibre laminates. The trichloroethylene absorption under the conditions given in Example 1 is 0.02% by weight.

EXAMPLE 5

A solution of 792 g of 4,4'-methylene-bis-(N-phenylmaleimide) and 999 g of condensate 1 in 1.2 kg of methyl ethyl ketone is heated at the boil for 2.5 hours. Furthermore, 468 g of N,N,N',N'-tetraglycidyl-4,4'-diaminodiphenylmethane having an average epoxy content of 8.0 Eq/kg and 297 g of tetrabromobisphenol A diglycidyl ether are dissolved in 400 g of methyl ethyl ketone. These two solutions are mixed at room temperature, and the resulting solution is used as described in Example 1 together with glass mat for preparing laminates. The trichloroethylene vapour absorption under the conditions given in Example 1 is 0.03% by weight.

EXAMPLE 6

A solution is prepared from 194 g of 4,4'-methylene-bis-(N-phenylmaleimide) and 265 g of condensate II in 300 g of methyl ethyl ketone. This solution is heated at 84° C. for 2.5 hours. A further solution is prepared from 138 g of 1,1,2,2-tetra-(p-glycidyloxyphenyl)-ethane (ERRA® 0163), 121 g of tetrabromobisphenol A diglycidyl ether and 160 g of methyl ethyl ketone. The two solutions are mixed at room temperature. As described in Example 1, the mixture of the two solutions, together with glass mat, is used for preparing laminate. The trichloroethylene absorption under the conditions given in Example 1 is 0.02% by weight.

EXAMPLE 7

A solution of 264 g of 4,4'-methylene-bis-(N-phenylmaleimide) and 333 g of condensate I in 420 g of methyl ethyl ketone is heated at the boil for 1.5 hours. Furthermore, 210 g of a glycidylated phenol novolak resin having an average epoxy content of 5.6 Eq/kg and 121 g of tetrabromobisphenol A diglycidyl ether are dissolved in 200 g of methyl ethyl ketone. These two solutions are used as described in Example 1 together with glass mat for preparing laminates. These have excellent solvent resistance, as indicated by a trichlorothylene absorption of only 0.01% by weight.

EXAMPLE 8

A solution is prepared from 399.6 g of condensate I, 316.8 g of 4,4'-methylene-bis-(N-phenylmaleimide) and 520 g of methyl ethyl ketone. The solution is heated at the boil for 2.5 hours. A second solution is prepared from 266 g of 1,1,2,2-tetra-(p-glycidyloxyphenyl)- ethane, 145 g of tetrabromobisphenol A diglycidyl ether and 250 g of methyl ethyl ketone and is combined at room temperature with the first solution. The mixture of the two solutions is used as in Example 1 for preparing glass fibre laminates. The trichloroethylene absorption under the conditions given in Example 1 is 0.02% by weight, and the dielectric loss factor tan δ is 0.008 at 150° C. and 50 Hz/1000 V.

EXAMPLE 9

558 g of condensate I and 442 g of 4,4'-methylene-bis-(N-phenylmaleimide) are homogeneously mixed in a Kokneader and heated to about 120°-140° C. 597 g of the product obtained are dissolved in 597 g of 1-methoxypropanol. A solution is also prepared from 153 g of N,N,N'N'-tetraglycidyl-4,4'-diaminodiphenylmethane having an average epoxy content of 8.0 Eq/kg and 99 g of tetrabromobisphenol A diglycidyl ether in 150 g of methyl ethyl ketone. These two solutions are mixed at room temperature, and the resulting solution is used as described in Example 1 together with glass mat for preparing laminates. The trichloroethylene vapour absorption under the conditions given in Example 1 is 0.02% by weight.

EXAMPLE 10

A solution is prepared from 300 g of condensate IV, 145 g of 4,4'-methylene-bis-(N-phenylmaleimide) and 280 g of methyl ethyl ketone; it is refluxed at the boil for 4 hours. A second solution is prepared from 211 g of 1,1,2,2-tetra-(p-glycidyloxyphenyl)-ethane, 182 g of tetrabromobisphenol A diglycidyl ether and 260 g of methyl ethyl ketone. The two solutions are mixed; the mixture is used as described in Example 1 for preparing glass fibre laminates. If desired, 1.5 g of 2-phenylimidazole can also be added to the finished impregnating solution. The trichloroethylene absorption of the laminates under the conditions given in Example 1 is 0.01% by weight.

EXAMPLE 11

A solution is prepared from 290 g of condensate V, 230 g of 4,4'-methylene-bis-(N-phenylmaleimide) in 410 g of 1-methoxypropan-2-ol by heating the mixture at 60° C. for 4–6 hours. A second solution is prepared from 133 g of N,N,N',N'-tetraglycidyl-4,4'-diaminodiphenylmethane having an average epoxy content of 8.0 Eq/kg and 86 g of tetrabromobisphenol A diglycidyl ether in 120 g of methyl ethyl ketone. The two solutions are mixed, and the mixture is used as described in Example 1 for preparing glass fibre laminates. Their absorption of trichloroethylene under the conditions given in Example 1 is 0.02% by weight.

EXAMPLE 12

A solution of 290 g of condensate VI and 230 g of 4,4'-methylene-bis-(N-phenylmaleimide) in 410 g of 1-methoxypropan-2-ol is heated at about 95° C. for 6 hours. To this solution is added a second solution prepared from 137 g of N,N,N',N'-tetraglycidyl-4,4'-diaminodiphenylmethane having an average epoxy content of 8.0 Eq/kg, 82 g of tetrabromobisphenol A diglycidyl ether and 100 g of methyl ethyl ketone. The mixture of the two solutions is used as described in Example 1 for preparing glass fibre laminates. Their absorption of trichloroethylene under the conditions given in Example 1 is 0.03% by weight.

EXAMPLE 13

A solution is prepared from 333 g condensate I, 358 g of 4,4'-methylene-bis-(N-phenylmaleimide) and 460 g of methyl ethyl ketone; it is heated at the boil for 2 hours. To this is then added a solution of 153 g of N,N,N',N'-tetraglycidyl-4,4'-diaminodiphenylmethane having an average epoxy content of 8.0 Eq/kg and 99 g of tetrabromobisphenol A diglycidyl ether in 120 g of methyl ethyl ketone. The mixture of the two solutions is used as described in Example 1 for preparing glass fibre laminates. Their absorption of trichloroethylene under the conditions given in Example 1 is only 0.01% by weight.

What is claimed is:

1. A heat-curbale mixture which comprises
   (a) an epoxy resin having on average more than one 1,2-epoxy group per molecule,
   (b) a momoimide or polyimide of an unsaturated dicarboxylic acid of formula I

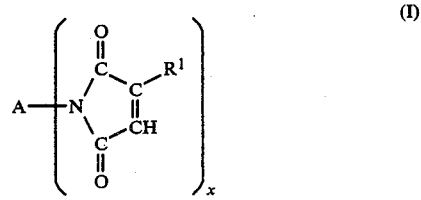

in which A is an x-valent organic radical having at least 2 and at most 30 C atoms, $R^1$ is an H atom or methyl, and x is 1, 2 or 3, and
   (c) a product of condensing (1) a phenol, (2) an amine and (3) an aldehyde or ketone in an acid medium by reacting with one another at a pH no higher than 6, wherein (1), (2) and (3) are
   (1) a substituted monohydric phenol which is unsubstituted in the p-position and in one of the two o-positions or in both o-positions; an unsubstituted dihydric mononuclear phenol or an unsubstituted or substituted dihydric or polyhydric dinuclear or polynuclear phenol which has at least two reactive ring positions for reaction with an aldehyde or ketone;
   (2) a substituted aromatic monoamine which has at least one reactive ring position for reaction with an aldehyde or ketone; an unsubstituted aromatic mononuclear or dinuclear diamine or an substituted aromatic mononuclear or dinuclear diamine which has at least two reactive ring positions for reaction with an aldehyde or ketone, and
   (3) an aldehyde or ketone, in a mixing ratio on a molar basis in the reaction mixture of phenol to amine to aldehyde or ketone of 1:1:1.2 to 6:1:8, and
   in the presence, in the curable mixture, of at least 1 equivalent of imide group per equivalent of amine-hydrogen and of at least 1 equivalent of phenolic hydroxyl group per epoxy equivalent.

2. A mixture according to claim 1 where in component (c) the mixing ratio of phenol to amine to aldehyde or ketone is 2:1:4 to 6:1:8.

3. A mixture according to claim 2 where the mixing ratio is 3:1:5 to 6:1:8.

4. A mixture according to claim 1 wherein component (a) is an epoxy compound having an aromatic grouping in the molecule.

5. A mixture according to claim 1 wherein component (a) is a polyglycidyl ether of a dihydric or polyhydric dinuclear or polynuclear phenol.

6. A mixture according to claim 1 wherein component (a) is an N-glycidyl compound of an aromatic amine.

7. A mixture according to claim 1 wherein component (b) is a bis-maleimide of formula I in which A is an aromatic or aliphatic radical, $R^1$ is an H atom, and x is 2.

8. A mixture according to claim 1 wherein component (b) is a bis-maleimide of formula I in which A is an aromatic radical, $R^1$ is an H atom, and x is 2.

9. A mixture according to claim 1 wherein the condensation product (c) is that wherein reaction component (1) takes the form of a substituted monohydric phenol which is unsubstituted in the p-position and in one of the two o-positions or in both o-positions, or of a substituted dihydric or polyhydric dinuclear or polynuclear phenol which has at least two reactive ring positions for reaction with an aldehyde or ketone.

10. A mixture according to claim 9 wherein the condensation product (c) is that wherein reaction component (1) takes the form of o- or p-alkylphenol or of a dihydric dinuclear phenol which is substituted in the o,o'-position.

11. A mixture according to claim 1 wherein the condensation product (c) is that wherein reaction component (2) takes the form of a substituted aromatic monoamine which has at least one reactive ring position for reaction with an aldehyde or ketone, or of an unsubstituted or substituted aromatic dinuclear diamine which has at least two reactive ring positions for reaction with an aldehyde or ketone.

12. A mixture according to claim 9 wherein the condensation product (c) is that wherein reaction component (2) is o-or p-toluidine, 2,6-diethylaniline, 4,4'-diaminodiphenyl sulfone or 3,3'-dimethyl-4,4'-diaminodiphenylmethane.

13. A mixture according to claim 1 wherein the condensation product (c) is that wherein reaction component (3) is formaldehyde, acetaldehyde, propionaldehyde or acetone.

14. A mixture according to claim 1 wherein the condensation product (c) is that which has been condensed at pH 5.5-0.5.

15. A mixture acccording to claim 1 wherein the condensation product (c) is that which has been obtained from a reaction mixture having a mixing ratio of phenol to amine to aldehyde or ketone of 2:1:4 to 6:1:8.

16. A process for preparing a crosslinked, insoluble and infusible plastic product from the curable mixture according to claim 1, which comprises curing the mixture within a temperature range from 120° to 250° C.

17. A process according to claim 16 wherein curing is carried out from 150° to 200° C.

* * * * *